Jan. 20, 1942.     H. C. LORD     2,270,673
RESILIENT MOUNTING
Filed Aug. 28, 1940     2 Sheets-Sheet 2
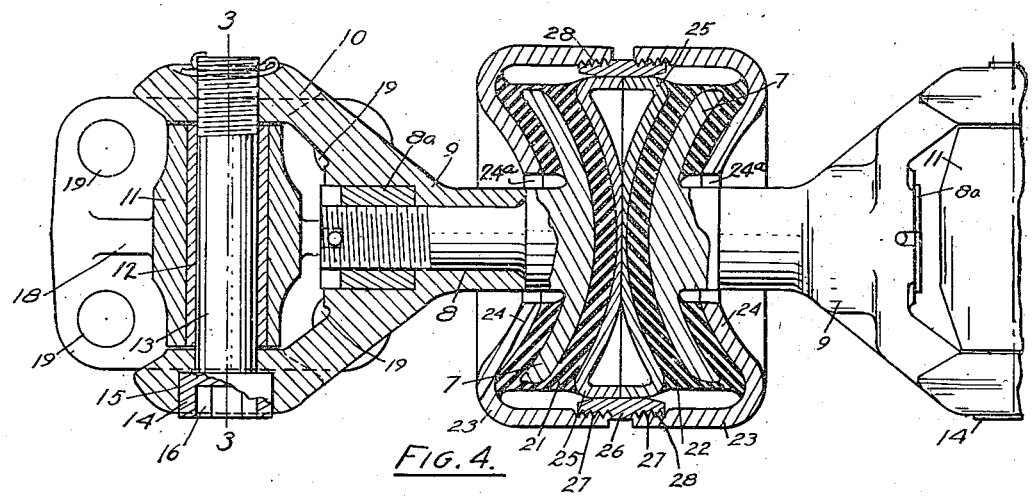
Fig. 4.
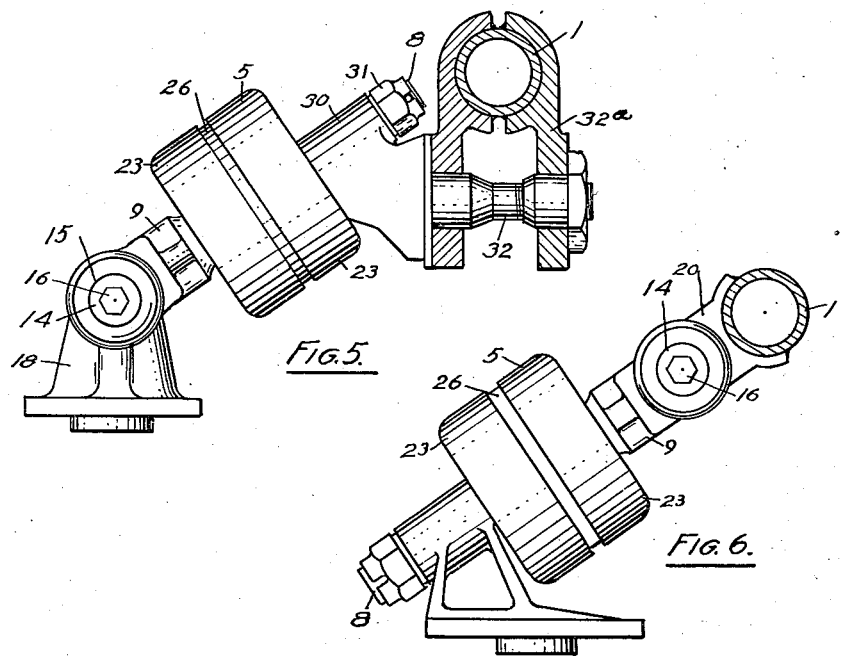
Fig. 5.
Fig. 6.
INVENTOR
Hugh C. Lord

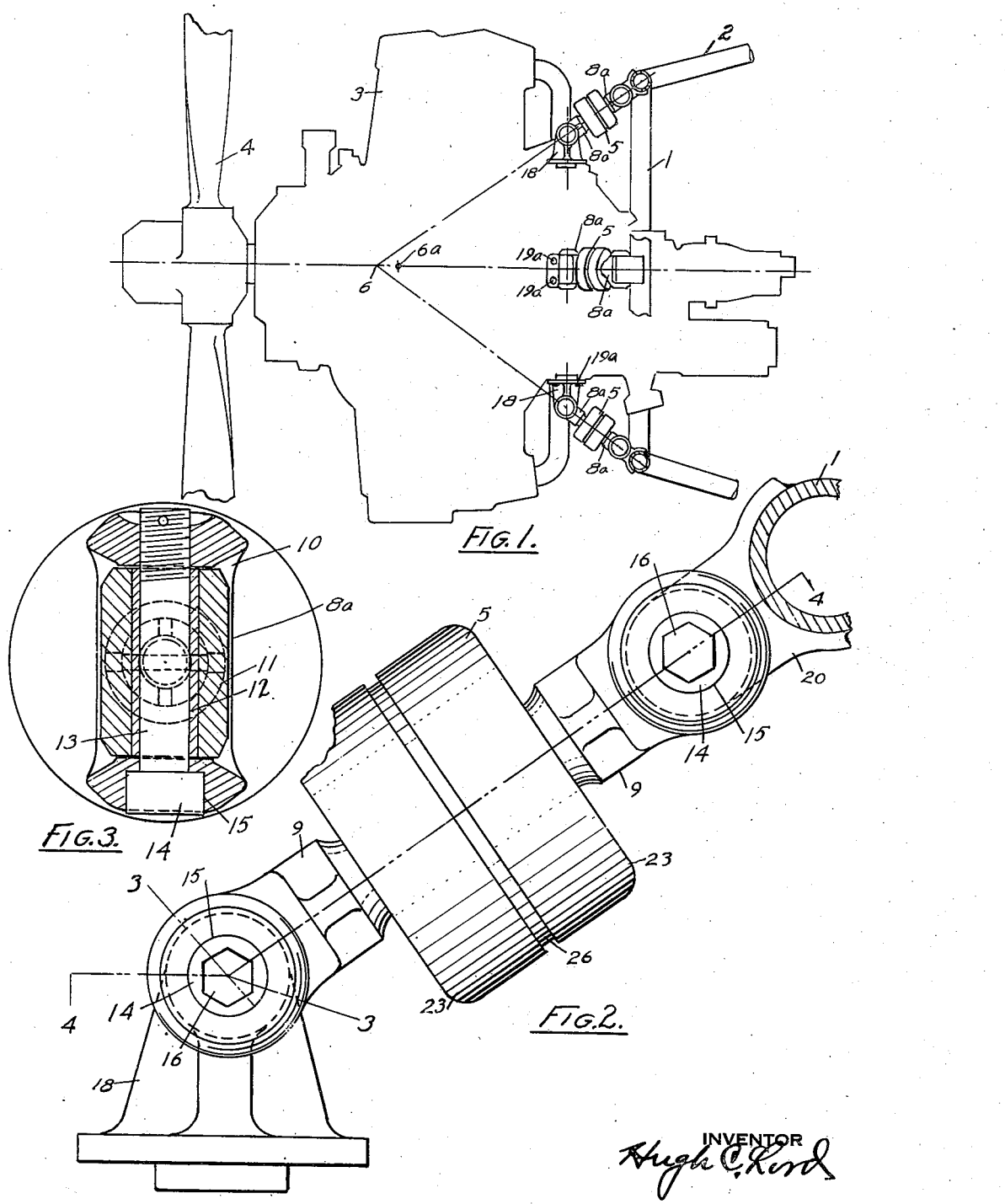

Patented Jan. 20, 1942

2,270,673

UNITED STATES PATENT OFFICE 2,270,673

RESILIENT MOUNTING

Hugh C. Lord, Erie, Pa., assignor to Lord Manufacturing Company, Erie, Pa., a corporation of Pennsylvania Application August 28, 1940, Serial No. 354,595

21 Claims. (Cl. 248—5)

The present invention is intended to support vibrating bodies. As exemplified, it is arranged to support an overhung vibrating body having torque induced vibrations and, as shown, it forms the mounting for an overhung airplane engine carrying the propeller and is therefore subjected to the varying disturbing factors involved in these structures.

In a prior application filed March 6, 1940, we have shown a construction having converging links with spherical rubber insulated joint elements swinging to accommodate torque, pitch and yaw movements. In that structure the resistance to movement may be varied somewhat by the location of the mountings closer to or more remote from the axis. In other words, the supporting ring may be smaller or larger, and thus vary the relations resisting torque and pitch and yaw more or less, but it is often difficult to vary these relations sufficiently and it is often desirable to provide a more easily applied means for making such variation. Generally speaking, under many conditions it is desirable to reduce the pitch and yaw resistance in such structures. In the present invention this is accomplished. Features and details of the invention will appear from the specification and claims.

A preferred embodiment of the invention is illustrated in the accompanying drawings as follows:

Fig. 1 shows a side elevation of an airplane engine with its mounting, parts being broken away to better show construction.

Fig. 2 shows an elevation of one of the mounting units illustrated in Fig. 1.

Fig. 3 a section on the line 3—3 in Figs. 2 and 4.

Fig. 4 a section on the line 4—4 in Fig. 2.

Fig. 5 a side elevation of a modification showing an auxiliary joint at the engine end of the link.

Fig. 6 a side elevation of a further modification showing a single auxiliary joint at the support end of the link.

1 marks an engine supporting ring of an airplane, 2 struts leading to the ring, 3 an airplane engine supported in overhung relation from the ring, 4 a propeller carried by and driven from the engine.

The engine is supported by a series of resilient mountings 5 of link form secured to the ring and to the engine and converging toward a focal point 6, preferably in front of the center of gravity at 6a. The links correspond in general structure to the links shown in the prior application hereinbefore referred to.

This portion of the mounting is provided with spherical cores 7 carried by shanks 8. Fittings 9 are secured on these shanks by nuts 8a. The fittings have forks 10 which extend over the ends of a bearing 11, the bearing having a lining 12. A bearing bolt 13 extends through the forked ends 10 and the bearing.

The bolt head 14 extends into a socket 15. The head is provided with a recess wrench-hold 16. The opposite end of the bolt is screw-threaded and is screwed into screw threads 17 in the opposite forked end. The bolt is locked by a cotter pin 17a.

The bearing 11 is carried by a pedestal 18 which has perforations 19 for receiving screws 19a, securing the pedestal to the engine. In Figs. 2 and 4 the joints at both ends of the link are similar. At the ring end, however, the bearing is carried by a lug 20 secured on the supporting ring.

Resilient elements 21 and 22 are arranged each side of the cores 7.

Annular link structures 23 have inwardly extending spherical plates or members 24 opposing the outer faces of the cores. Plates 25 oppose the convex sides of the cores, these plates and cores being secured to the rubber preferably by bonding. The core has limited movement relatively to the shells 23 and the openings 24a permit movement of the shanks.

A securing tube 26 is externally screw threaded at 27, and the link shells 23 are internally screw threaded at 28 so that the shells, by means of the tubes, are secured together and the plates opposing the cores are maintained in place. The shell structures, swinging on the spherical joints formed by the cores and opposing surfaces, form a link free to move on the centers of the spherical surfaces in all directions.

As indicated in my former application, the core shanks may be secured rigidly to the engine and the ring support. Where this occurs the swinging of the link accommodates a movement in response to torque and pitch and yaw. The auxiliary joints connect the shanks with the engine and the supporting ring, these joints having their axes, as shown, tangential to arcs about the axis of the engine.

By placing the axes in the tangential position, the result is to reduce the resistance to pitch and yaw. Considering four mountings, one at the top, one at the bottom and one at each side, it will be noted that with a pitch movement the top and bottom mountings take care of this movement entirely through the swinging of the auxiliary joints and so far as these two mountings are concerned, they offer no substantial resistance to pitch movement, and similarly the side auxiliary joints offer no resistance to yaw movement. On the other hand, all four of the mountings give a full resistance of the rubber elements to the torque movement because the auxiliary joints are substantially rigid in the torque direction.

If it were desired to reverse this situation (usually it is not desirable), the axes of the auxiliary joints may be placed tangential to the movement which it is desired to reduce, such, for instance, as the pitch and yaw.

The reduction incident to placing these auxiliary joints at each end of each link provides a very great reduction in the pitch and yaw resistance, substantially half of such resistance. In some instances a smaller reduction in resistance may be desired, and this may be accomplished by confining the auxiliary joint to one end of the link.

In Fig. 5 such a structure is illustrated, the auxiliary joint connecting the link structure with the engine, this joint being similar to the joint at the support end of the link in Figs. 2 and 4. In this structure the shank 8 extends through a fitting 30 and is secured therein by a nut 31. The fitting has a rearwardly extending stud 32 which extends into a bracket 32a secured on the ring.

In Fig. 6 a modification is shown in which the auxiliary joint is connected to the ring support, the joint being similar to that shown in Figs. 2 and 4 at the end of the link next to the engine.

With these structures it will be noted the movement of the mounting units which are in the plane of the pitch and yaw movement is reduced for the pitch or yaw movements by relieving the rubber of those mountings of the movement which is taken care of by the single auxiliary joint. Thus the total effective resistance for pitch and yaw is materially reduced over a structure where the auxiliary joints are not used and entire movement for all directions is accommodated by the sandwich type joints in the link.

It will be noted that in the structure illustrated in Figs. 5 and 6 the spherical member including the plate 7 secured directly to the pedestal operates as a universal joint which in this instance has its movement accommodated by the rubber insert, but it will be understood that this spherical joint need not be limited to the specific spherical joint involving the rubber elements in connection with a core 7.

It will also be noted that in the structure shown in Figs. 2 and 4, one of the spherical portions including the core 7 may be considered as a spherical joint operating in connection with the joints swinging about a constant axis.

What I claim as new is:

1. A yielding mounting comprising members having opposing faces, an element of resilient material between the faces yieldingly resisting shear movement of the members in different edgewise directions of the faces, attaching means for the members adapted to secure the members to structures to be connected by the mounting, the attaching means of at least one of the members being provided with an auxiliary swinging joint swinging about a substantially constant axis extending in the same general direction as the faces of the members, the faces of the members being positioned crosswise of the line of direct stress between the attaching means.

2. A yielding mounting comprising members having opposing faces, an element of resilient material between the faces yieldingly resisting shear movement of the members in different edgewise directions of the faces, attaching means for the members adapted to secure the members to structures to be connected by the mounting, the attaching means of each member being provided with an auxiliary swinging joint, at least one of the joints swinging about a substantially constant axis extending in the same general direction as the faces of the members, the faces of the members being positioned crosswise of the line of direct stress between the attaching means.

3. A yielding mounting comprising members having opposing faces, an element of resilient material between the faces yieldingly resisting shear movement of the members in different edgewise directions of the faces, attaching means for the members adapted to secure the members to structures to be connected by the mounting, the attaching means of each member being provided with an auxiliary swinging joint, one of the joints swinging about a substantially constant axis extending in the same general direction as the faces of the members and the other of said joints swinging in a plurality of directions, the faces of the members being positioned crosswise of the line of direct stress between the attaching means.

4. A yielding mounting comprising members having opposing approximately spherical faces, an element of resilient material between the faces yieldingly resisting shear movement of the members in different edgewise directions of the faces, attaching means for the members adapted to secure the members to structures to be connected by the mounting, the attaching means of at least one of the members being provided with an auxiliary swinging joint swinging about a substantially constant axis extending in the same general direction as the faces of the members, the faces of the members being positioned crosswise of the line of direct stress between the attaching means.

5. A yielding mounting comprising members having opposing approximately spherical faces, an element of resilient material between the faces yieldingly resisting shear movement of the members in different edgewise directions of the faces, attaching means for the members adapted to secure the members to structures to be connected by the mounting, the attaching means of each member being provided with an auxiliary swinging joint, at least one of the joints swinging about a substantially constant axis extending in the same general direction as the faces of the members, the faces of the members being positioned crosswise of the line of direct stress between the attaching means.

6. A yielding mounting comprising members having opposing approximately spherical faces, an element of resilient material between the faces yieldingly resisting shear movement of the members in different edgewise directions of the faces, attaching means for the members adapted to secure the members to structures to be connected by the mounting, the attaching means of each member being provided with an auxiliary swinging joint, one of the joints swinging about a substantially constant axis extending in the same general direction as the faces of the members and the other of said joints swinging in a plurality of directions, the faces of the members being positioned crosswise of the line of direct stress between the attaching means.

7. In a mounting assembly a vibrating body and a mounting means attached thereto for supporting the body including a group of units, each unit comprising members having opposing faces, an element of resilient material between the faces yieldingly resisting shear movement of the members in different edgewise directions of the faces, attaching means for the members adapted to secure the members to the body and to a structure to be connected to the body by the assembly, the attaching means of at least one of the members being provided with an auxiliary swinging joint swinging about a substantially constant axis extending in the same general direction as the faces of the members, the faces of the members being positioned crosswise of the line of direct stress between the attaching means.

8. In a mounting assembly a vibrating body and a mounting means attached thereto for supporting the body including a group of units, each unit comprising members having opposing faces, an element of resilient material between the faces yieldingly resisting shear movement of the members in different edgewise directions of the faces, attaching means for the members adapted to secure the members to the body and to a structure to be connected to the body by the assembly, the attaching means of each of the members being provided with an auxiliary swinging joint, at least one of the joints swinging about a substantially constant axis extending in the same general direction as the faces of the members, the faces of the members being positioned crosswise of the line of direct stress between the attaching means.

9. In a mounting assembly a vibrating body and a mounting means attached thereto for supporting the body including a group of units, each unit comprising members having opposing approximately spherical faces, an element of resilient material between the faces yieldingly resisting shear movement of the members in different edgewise directions of the faces, attaching means for the members adapted to secure the members to the body and to a structure to be connected to the body by the assembly, the attaching means of each of the members being provided with an auxiliary swinging joint, at least one of the joints swinging about a substantially constant axis extending in the same general direction as the faces of the members, the faces of the members being positioned crosswise of the line of direct stress between the attaching means.

10. In a mounting assembly a vibrating body and a mounting means attached thereto for supporting the body including a group of units, each unit comprising members having opposing approximately spherical faces, an element of resilient material between the faces yieldingly resisting shear movement of the members in different edgewise directions of the faces, attaching means for the members adapted to secure the members to the body and to a structure to be connected to the body by the assembly, the attaching means of each of the members being provided with an auxiliary swinging joint, at least one of the joints swinging about a substantially constant axis extending in the same general direction as the faces of the members and the other of said joints swinging in a plurality of directions, the faces of the members being positioned crosswise of the line of direct stress between the attaching means.

11. In a mounting assembly a vibrating body and a mounting means attached thereto for supporting the body including a group of units, each unit comprising members having opposing approximately spherical faces, an element of resilient material between the faces yieldingly resisting shear movement of the members in different edgewise directions of the faces, attaching means for the members adapted to secure the members to the body and to a structure to be connected to the body by the assembly, the attaching means of each of the members being provided with an auxiliary swinging joint, at least one of the joints swinging about a substantially constant axis extending in the same general direction as the faces of the members and the other of said joints being formed with spherical surfaces with an element of resilient material between the spherical surfaces and accommodating the joint movement by the distortion of the resilient material, the faces of the members being positioned crosswise of the line of direct stress between the attaching means.

12. In a mounting assembly a vibrating body having induced torsional vibrations and at least another mode of vibration, a mounting means attached thereto for supporting the body including a group of three or more out of line units, each unit comprising members having opposing faces, an element of resilient material between the faces yieldingly resisting shear movement of the members in different edgewise directions of the faces, attaching means for the members adapted to secure the body to a structure to be connected to the body by the assembly, the attaching means of at least one of the members being provided with an auxiliary swinging joint swinging about a substantially constant axis extending in the same general direction as the faces of the members, the faces of the members being positioned crosswise of the line of direct stress between the attaching means.

13. In a mounting assembly a vibrating body having induced torsional vibrations and at least another mode of vibration, a mounting means attached thereto for supporting the body including a group of three or more out of line units, each unit comprising members having opposing approximately spherical faces, an element of resilient material between the faces yieldingly resisting shear movement of the members in different edgewise directions of the faces, attaching means for the members adapted to secure the body to a structure to be connected to the body by the assembly, the attaching means of at least one of the members being provided with an auxiliary swinging joint swinging about a substantially constant axis extending in the same general direction as the faces of the members, the faces of the members being positioned crosswise of the line of direct stress between the attaching means.

14. In a mounting assembly a vibrating body having rotatively induced vibrations and another mode of vibration, and a mounting means attached thereto for supporting the body including a plurality of units, each unit comprising a member having opposing faces with resilient material between the faces yieldingly resisting shear movement of the members in different edgewise directions, attaching means for the members adapted to secure the members to the body and to a structure to be connected with the body by the assembly, the attaching means of at least one of the members being provided with an auxiliary swinging joint swinging about a substantially constant axis extending in the general direction of the faces of the members, the faces of the members being positioned crosswise of the line of stress between the attaching means, said lines of the different units converging.

15. In a mounting assembly a vibrating body having rotatively induced vibrations and another mode of vibration, and a mounting means attached thereto for supporting the body including a plurality of units, each unit comprising a member having opposing approximately spherical faces with resilient material between the faces yieldingly resisting shear movement of the members in different edgewise directions, attaching means for the members adapted to secure the members to the body and to a structure to be connected with the body by the assembly, the attaching means of at least one of the members being provided with an auxiliary swinging joint swinging about a substantially constant axis extending in the general direction of the faces of the members, the faces of the members being positioned crosswise of the line of stress between the attaching means, said lines of the different units converging.

16. In a mounting assembly a vibratory body having induced torsional vibrations and another mode of vibration, and a mounting means attached thereto for supporting the body including a group of three or more units arranged about the torsional axis, each unit comprising members having opposing faces and an element of resilient material between the faces yieldingly resisting shear movement of the members in different edgewise directions of the faces, attaching means for the members adapted to secure the members to the body and to structures to be connected to the body by the assembly, the attaching means of at least one of the members being provided with an auxiliary swinging joint swinging about a substantially constant axis extending in the same general direction as the faces of the members, the units being grouped in a plane extending across the torsional axis and the faces of the members being positioned crosswise of the line of direct stress between the attaching means, said lines of the different units converging toward a focal point offset from the plane of the units.

17. In a mounting assembly a vibratory body having induced torsional vibrations and another mode of vibration, and a mounting means attached thereto for supporting the body including a group of three or more units arranged about the torsional axis, each unit comprising members having opposing approximately spherical faces and an element of resilient material between the faces yieldingly resisting shear movement of the members in different edgewise directions of the faces, attaching means for the members adapted to secure the members to the body and to structures to be connected to the body by the assembly, the attaching means of at least one of the members being provided with an auxiliary swinging joint swinging about a substantially constant axis extending in the same general direction as the faces of the members, the units being grouped in a plane extending across the torsional axis and the faces of the members being positioned crosswise of the line of direct stress between the attaching means, said lines of the different units converging toward a focal point offset from the plane of the units.

18. In a mounting assembly a vibratory body having induced torsional vibrations and another mode of vibration, and a mounting means attached thereto for supporting the body including a group of three or more units arranged about the torsional axis, each unit comprising members having opposing approximately spherical faces and an element of resilient material between the faces yieldingly resisting shear movement of the members in different edgewise directions of the faces, attaching means for the members adapted to secure the members to the body and to structures to be connected to the body by the assembly, the attaching means of each of the members being provided with an auxiliary joint, one of said joints swinging about a substantially constant axis extending in the same general direction as the faces of the members and the other of said joints swinging in a plurality of directions, the units being grouped in a plane extending across the torsional axis and the faces of the members being positioned crosswise of the line of direct stress between the attaching means, said lines of the different units converging toward a focal point offset from the plane of the units.

19. A yielding mounting comprising members having opposing approximately spherical faces, an element of resilient material between the faces yieldingly resisting shear movement of the members in different edgewise directions of the faces, attaching means for the members adapted to secure the members to structures to be connected by the mounting, the attaching means of one of the members being provided with an auxiliary swinging joint swinging about a substantially constant axis extending in the same general direction as the faces of the members, and the attaching means of the other of said members being provided with an auxiliary joint swinging about a substantially constant axis extending in the general direction of the faces of the members and a spherical joint having spherical faces and an intermediate element of rubber accommodating the movement of the joint by the distortion of the rubber, the faces of the members being positioned crosswise of the line of direct stress between the attaching means.

20. A yielding mounting comprising members having opposing faces, an element of resilient material between the faces yieldingly resisting shear movement of the members in an edgewise direction of the faces, attaching means for the members adapted to secure the members to structures to be connected by the mounting, the attaching means of each member being provided with an auxiliary swinging joint, at least one of the joints swinging about a substantially constant axis extending in the same general direction as the faces of the members, the faces of the members being positioned crosswise of the line of direct stress between the attaching means.

21. In a mounting assembly a vibratory body having induced torsional vibrations and another mode of vibration, and a mounting means attached thereto for supporting the body including a group of three or more units arranged about the torsional axis, each unit comprising members having opposing faces and an element of resilient material between the faces yieldingly resisting shear movement of the members in an edgewise direction of the faces, attaching means for the members adapted to secure the members to the body and to structures to be connected to the body by the assembly, the attaching means of each member being provided with an auxiliary swinging joint, at least one of the joints swinging about a substantially constant axis extending in the same general direction as the faces of the members, the units being grouped in a plane extending across the torsional axis and the faces of the members being positioned crosswise of the line of direct stress between the attaching means, said lines of the different units converging toward a focal point offset from the plane of the units.

HUGH C. LORD.